Jan. 18, 1944.    H. G. KAMRATH    2,339,703
COILED PAPER FILTER
Filed Dec. 9, 1940
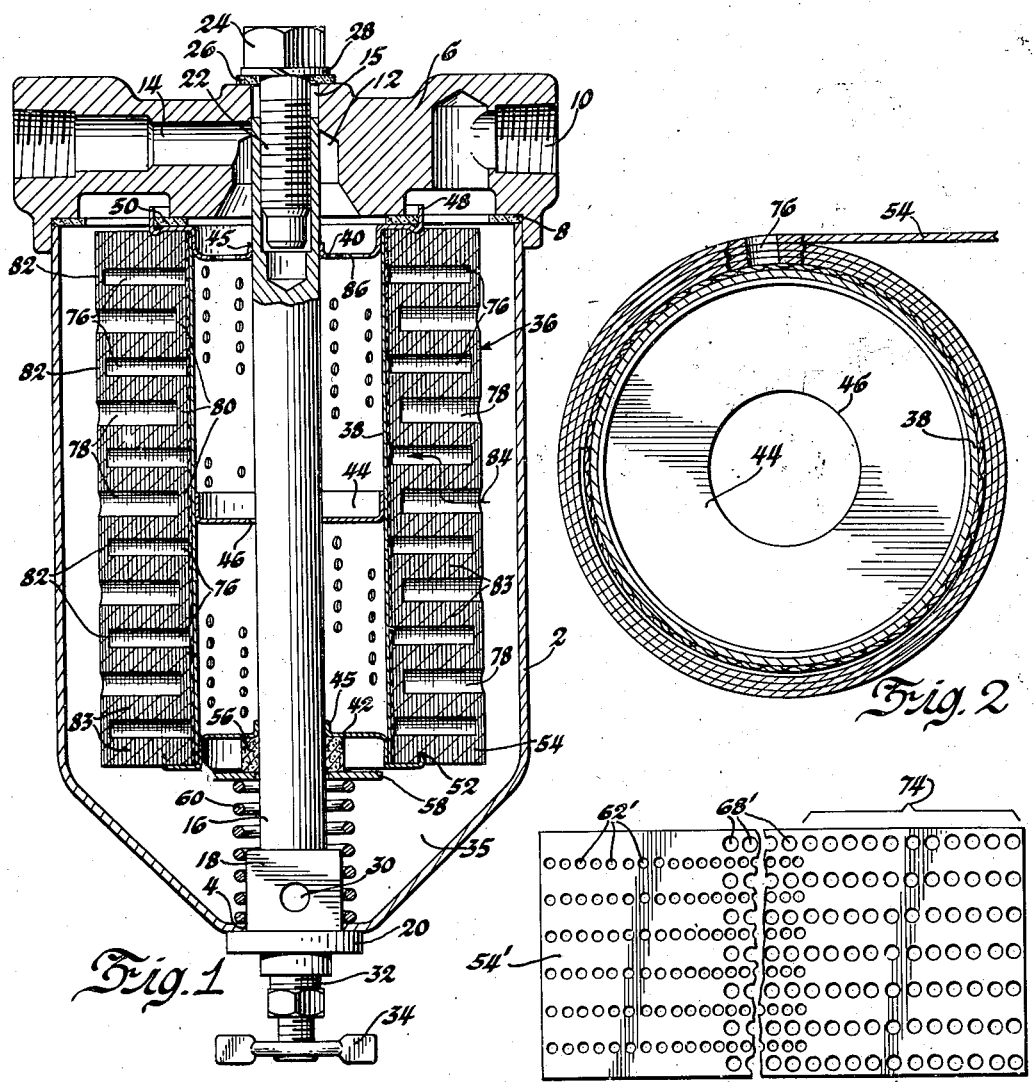
Fig. 1
Fig. 2
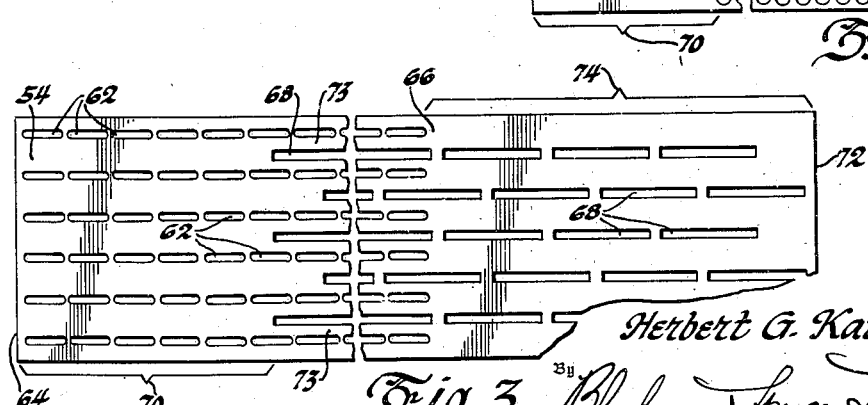
Fig. 3
Fig. 4
Inventor
Herbert G. Kamrath
Attorneys Patented Jan. 18, 1944

2,339,703

UNITED STATES PATENT OFFICE 2,339,703

COILED PAPER FILTER

Herbert G. Kamrath, Flint, Mich., assignor to General Motors Corporation, Detroit, Mich., a corporation of Delaware Application December 9, 1940, Serial No. 369,174

7 Claims. (Cl. 210—112)

This invention relates to filters and has particular reference to the oil filters used on internal combustion engines of automotive vehicles.

The novelty of the invention relates to the filtering element itself which comprises a roll of paper formed by winding a strip of paper around a central screen or a perforated column. The paper has a series of mating openings, and when the paper is wound or coiled about the column the openings mate with each other to form a series of radial passages. Some of the passages are closed at the inside or adjacent the perforated column, while others are closed at the outside of the filtering element. The passages open at the inside are alternated with the passages open at the outside and the liquid to be filtered enters from the outside of the filtering element and flows into the radial passages. The contaminated matter is retained at the edge of the paper, and the filtered oil moves transversely of the filter paper from the passages open at the outside into the passages closed at the outside and open at the inside. From these passages the oil flows into the perforated column and then to the outlet of the filter.

The passages receiving the filtered oil, or those which are open adjacent the perforated column, are smaller than the passages open at the outside which receive the oil to be filtered. The reason for this is to enable a greater number of oil receiving passages to be formed to increase the filtering area of the filter.

On the drawing

Figure 1 is a sectional detailed view through the filter and the container therefor.

Figure 2 is an enlarged sectional plan view of the filtering unit showing the manner in which the filter is made, parts being broken away and shown in section better to illustrate the construction.

Figure 3 is an expanded view of the roll of filter paper showing the manner in which the openings are applied.

Figure 4 is a view similar to Figure 3 of a modification.

Referring to the drawing, the container for the filter is indicated at 2. This container has a conical shaped lower end with an opening 4 at its bottom while the top is entirely open. Over the top there is fitted the cap or cover 6 and between the cover and the edge of the container 2 a gasket 8 is applied to make a liquid-tight connection. The cover has the inlet passage 10 and the outlet passage comprising the upright passage 12 and the horizontal passage 14. The passages 10 and 14 are threaded to enable the application of a pipe or suitable fitting.

The cap or top 6 has an opening 15 therein which is concentric with the opening 4 at the bottom of the container 2 and through the openings 4 and 15 there is passed the central bolt 16 having a square head 18 surmounted by a second head 20 which fits against the outside of the container 2 below the opening 4. If desired, a gasket may be placed between the head 20 and the lower part of the container 2.

The upper part of the bolt 16 is interiorly threaded to receive the threaded shank 22 of a bolt the head of which is indicated at 24. A suitable gasket 26 is placed between the lock washer 28 and the cover 6 to form a liquid tight connection. By tightening the head 24 of the bolt the gaskets are tightened to form a liquid tight connection.

The head 18 has the opening 30 which leads to a passage in a sludge outlet element indicated as a whole at 32. By rotating the handle 34 a part of the element is turned inwardly to unseat a valve to enable the sludge in the sump 35 to pass through the opening 30 and out through the bore of the sludge outlet member 32.

The filtering element as a whole is indicated at 36. This element comprises the central screen or a perforated column 38 strengthened at its ends by the reinforcing plates 40 and 42 and at its middle by the reinforcing plate 44. If desired, a sheet of suitable fabric may be wrapped directly around the screen or column. The end plates 40 and 42 are depressed at their centers and fit inside of and are rigidly secured to the ends of the perforated column 38. The end members 40 and 42 also have an inner flange 45 which fits snugly and tightly about the bolt 16. The center reinforcing member 44 is provided with an oversized opening 46 through which the bolt passes.

The upper reinforcing member 40 is formed with an annular upstanding flange 48 inside of which there is received the gasket 50 which presses against a seat on the underside of the head 6.

The lower reinforcing member 42 is provided with an inturned flange 52 which extends into the filtering paper 54.

A piece of packing 56 is positioned around the bolt 16 and against the outside of the lower reinforcing member 42, and a washer 58 surrounds the pipe and is seated against the underside of the packing 56. A coil spring 60 surrounds the bolt 16 and the head 18. This spring is under compression and presses upwardly against the washer 58 and tightly forces the packing 56 against the underside of the lower reinforcing member 42 and also presses the gasket 50 between the reinforcing member 40 and the seat on the cap 6, to form liquid tight connections.

The filtering material 54 is comprised of paper and the developed view of the filter paper is shown in Figure 3. This paper has a plurality of elongated openings 62 which commence at the inner end 64 of the paper and extend substantially the entire length of the paper. These smaller openings terminate at 66.

A second series of openings 68 considerably larger than the first openings 62 commences at a given distance from the end of the sheet. This distance is indicated by the brace 70. For a filter such as is ordinarily used, the distance from the end 64 of the paper to the first opening 68 is about nine inches. Similarly, the distance from the last opening 66 to the outer end 72 of the sheet, or a distance indicated by the brace 74, is about thirty inches. The openings 68 continue to substantially the outer end 72 of the sheet of paper. The openings 62 and 68 are spaced by the width of the paper indicated at 73.

The paper is wound about the central perforated column 38 in the manner shown in Figure 2. The end 64 is placed immediately adjacent the column and paper wound or turned around the column until the desired thickness of filter is obtained, as shown in Figure 1. As the paper is wound about the column the openings 62 will mate with each other to form the passages 76. Owing to the fact that the openings 62 extend from the extreme end 64 of the paper, the passages 76 formed thereby will be open against the perforated column, but as the larger passages 78 formed by the openings 68 do not begin to be formed until several convolutions of paper have been turned about the column 38, these passages will be closed at their inner ends as indicated by the paper shown at 80. The continued winding or turning of the paper 54 about the column 38 will form the completed passages 76 and 78, but as the openings 62 stop at a point 66, spaced a distance indicated by the brace 74, from the end of the sheet, the final windings of the paper will close the ends of the passages 76 as indicated by the paper at 82. The paper of the spaces 73 between the rows of openings will form the paper columns 83 indicated in Figure 1. The end 72 may be secured to the roll in any suitable way, such as by metallic fasteners.

In winding the paper about the central perforated column, each succeeding winding will cause a greater circumference or cylinder of paper to form the succeeding layer, but by suitably spacing the openings 62 and 68 on the flat sheet as shown in Figure 3, the openings can be caused to mate with each other properly to form the columns or passages 76 and 78. These passages will be substantially radial to the central column 38. It is of no materiality that there is not an accurate mating of the openings, and they may be even slightly out of line and the passages 76 and 78 may have their edges slightly irregular, but this will in no way interfere with the effectiveness of the filter.

Figure 4 shows a modification of the paper 54' which is used to form the paper filtering element. Instead of the rather elongated slots or openings 62 and 68, round openings 62' and 68' are used but the formation of the filter by winding is the same as with the species which uses the filter paper of Figure 3.

The oil as it enters the inlet 10 will fill the space in the container 2 between the filter element 36 and the inner walls of the container 2. The oil to be filtered will flow into the larger passages 78 and then pass transversely across the intervening paper into the narrow passages 76, as is indicated by the arrow 84 in Figure 1. Owing to the fact that the oil when it reaches the passage 76 is filtered, there is no reason for having a very large passage and the perforations in the column 38 will readily enable the oil to flow away from the paper. For this reason the passages 76 or the openings 62 are made much smaller than the passages 78 or openings 68. The reason for this is that by using smaller passages 76 a larger number of filtering openings 68 or filtering passages 78 may be used and thereby increase the filtering area of the filter.

A small amount of oil will be filtered by the paper at 80.

After the oil passes into the perforated column 38, it will flow upward either through the opening 46 or through the openings 86 in the upper reinforcing element 40, and then to the outlet passages 12 and 14.

The filter unit 36 is removable. By unscrewing the bolt 24, the cover 6 may be removed, or the container 2 may be separated from the cover. The unit 36 may now be withdrawn by slipping it over the bolt 16. A new filtering unit can now be applied.

If desired, the paper 54 may be rolled around the column 38 in the opposite direction; that is, the larger openings 68 or 68' may be placed against the column 38 at the start of the winding. The larger passages 78 now will be open at their inner ends and closed at their outer ends and the smaller passages 76 will be closed at their inner ends and open at their outer ends. The flow of oil now will be from the inside, or column side, to the outside. The result, in so far as filtering is concerned, will be substantially the same regardless of in which direction the oil flows.

If desired, a fabric or screen may be wound around the column 38 between the paper 54 and the column.

I claim:

1. In a filter, a central perforated column, and a roll of paper on said column, said paper being coiled or wound about said column and having a plurality of openings therein which mate with each other when the paper is coiled or wound about the column to form a plurality of radial passages, some of said passages being closed at the inside or column side of the roll and open at the outside thereof, some of said passages being closed at the outside of the roll and open at the inside thereof, whereby to enable a transverse movement of the liquid through the filtering paper, said liquid passing from the passages closed at the inside of the roll into the passages closed at the outside.

2. In a filter, a central perforated column, and a roll of paper on said column, said paper being coiled or wound about said column and having a plurality of openings therein which mate with each other when the paper is coiled or wound about the column to form a plurality of radial passages, some of said passages being closed at the inside or column-side of the roll and open at the outside thereof, some of said passages being closed at the outside of the roll and open at the inside thereof, the passages closed at the inside of the roll being larger than the passages closed at the outside of the roll whereby to unable a transverse movement of the liquid through the filtering paper.

3. In a filter, a central perforated column, and a roll of paper on said column, said paper being coiled or wound about said column and having a plurality of openings therein which mate with each other when the paper is coiled or wound about the column to form a plurality of radial passages, some of said passages being closed at the inside or column side of the roll and open at the outside thereof, some of said passages being closed at the outside of the roll and open at the inside thereof, the liquid to be filtered entering the passages opening to the outside of the filter and moving transversely of the paper to the passages opening at the inside, said passages opening at the inside being smaller than the passages opening at the outside to enable a larger number of passages to be made to increase the filtering area.

4. In a filter, a central perforated column, a roll of paper wound about said column, a plurality of radial passages formed in said paper, some of said passages being open at the outside of the filter and closed at the inside and other of said passages being open at the inside and closed at the outside, to cause most of the liquid to be filtered to pass transversely from the passages open at the outside to the passages open at the inside and into the perforated column.

5. In a filter, a central perforated column, a roll of paper about said column, radial passages formed in said paper and closed at their outer ends and open at their inner ends, radial passages larger than the first-named passages formed in said paper and alternating with the first-named passages, said second-named passages being closed at their inner ends and open at their outer ends, columns of paper between said radial passages, the liquid to be filtered passing from the outside to the inside of the filter.

6. In a filter, a central perforated column, and a roll of paper on said column, said paper being coiled or wound about said column and having a plurality of openings therein which mate with each other when the paper is coiled or wound about the column to form a plurality of radial passages, the ends of some of said passages being closed at the inside or column-side of the roll, the ends of some of said passages being closed at the outside of the roll, the liquid to be filtered passing in the filtering process from the passages closed at one end to the passages closed at the other end.

7. In a filter, a central perforated column, and a roll of paper on said column, said paper being coiled or wound about said column and having a plurality of openings therein which mate with each other when the paper is coiled or wound about the column to form a plurality of radial passages, the ends of some of said passages being closed at the inside or column-side of the roll, the ends of some of said passages being closed at the outside of the roll, the liquid to be filtered passing in the filtering process from the passages closed at one end to the pasages closed at the other end, the passages open to the liquid to be filtered being larger than the passages carrying the filtered liquid.

HERBERT G. KAMRATH.